*INVENTOR.*
RUDOLPH BACHMAN
BY
Leonard H. King
AGENT

Nov. 11, 1958 R. BACHMAN 2,859,845
ELECTROMAGNETIC CLUTCH
Filed March 3, 1955 2 Sheets-Sheet 2
FIG. 3
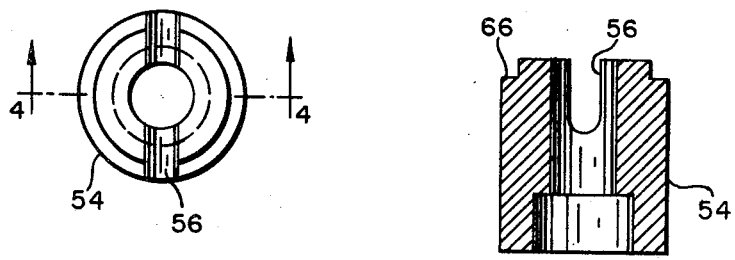
FIG. 4
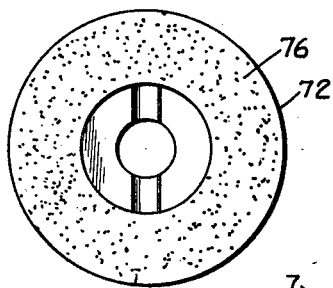
FIG. 6
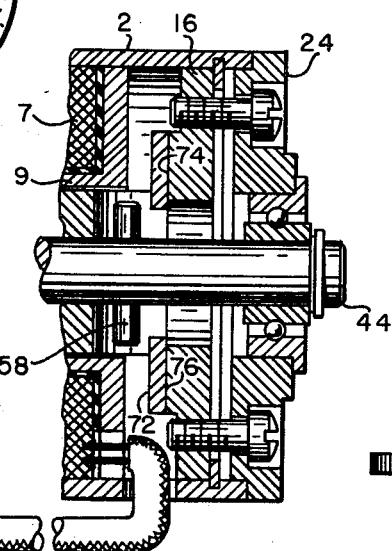
FIG. 5
FIG. 7
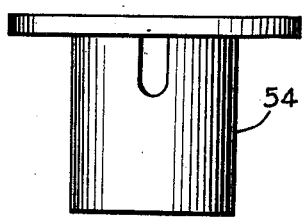
*INVENTOR.*
RUDOLPH BACHMAN
BY
Leonard H. King
AGENT

United States Patent Office 2,859,845
Patented Nov. 11, 1958

2,859,845

ELECTROMAGNETIC CLUTCH

Rudolph Bachman, Babylon, N. Y., assignor to Sterling Precision Instrument Corporation, Flushing, N. Y.

Application March 3, 1955, Serial No. 491,888

4 Claims. (Cl. 192—18)

This invention relates to miniature electro-magnetic clutches and, in particular, to such clutches suitable for use in precision instruments, high accuracy computers, miniature servo systems, guided missiles and the like.

While electro-magnetic clutch mechanisms, per se, are old in the art, such prior art devices are in general bulky, cumbersome, slow acting and otherwise not suitable for use in precision instruments, guided missiles, high accuracy computers, miniature servo systems and the like.

On the other hand there is disclosed hereinafter a commercially available miniature clutch which is only 1" in diameter and but 2" long. The devices of this invention have an engagement time of but 0.003 second and are suitable for the above stated applications.

Conventional clutch mechanisms are usually provided with axially aligned "input" and "output" shafts extending from opposite sides of the mechanism. When such a clutch is employed in a gear train it is necessary to provide cigars in two distinct planes in order to couple together input and output mechanisms. The clutch mechanism of this invention provides coaxially positioned input and output shafts extending from the same side of the mechanism. In turn this makes practical the construction of a compact gear train.

It is an object of this invention to provide a miniature electro-magnetically engaged clutch.

It is also an object of this invention to provide a rapid acting clutch mechanism.

A further object of this invention is to provide a clutch having self-aligning engaging faces.

Still a different object of this invention is to provide an enclosed magnetic clutch mechanism.

A particular object of this invention is to provide a single-ended magnetic clutch.

Another object of this invention is to provide a miniature electro-magnetic clutch incorporating a brake.

Another particular object of this invention is the provision of a clutch mechanism having shafts not subjected to axial movement.

These and other objects, aspects and advantages, will be in part pointed out and in part apparent from the following description considered in conjunction with the accompanying drawings which shows a preferred embodiment of the invention for an electro-magnetic clutch.

In the drawings:

Figure 3 shows an end view of a component member of the clutch shown in Figure 1 and 2.

Figure 4 is a cross-sectional view taken along plane 4—4 of Figure 3.

Figure 5 shows in cross-section a portion of an alternate embodiment of this invention having incorporated braking means.

Figure 6 is an end view of an armature member and braking member, with the braking surface exposed, as employed in the embodiment of Figure 5.

Figure 7 is a side view of the assembly shown in Figure 6.

The various figures are shown greatly enlarged for purposes of clarity, a typical device of this invention having a diameter of only one inch. The size may be varied to meet the requirements of particular applications.

Figure 2:
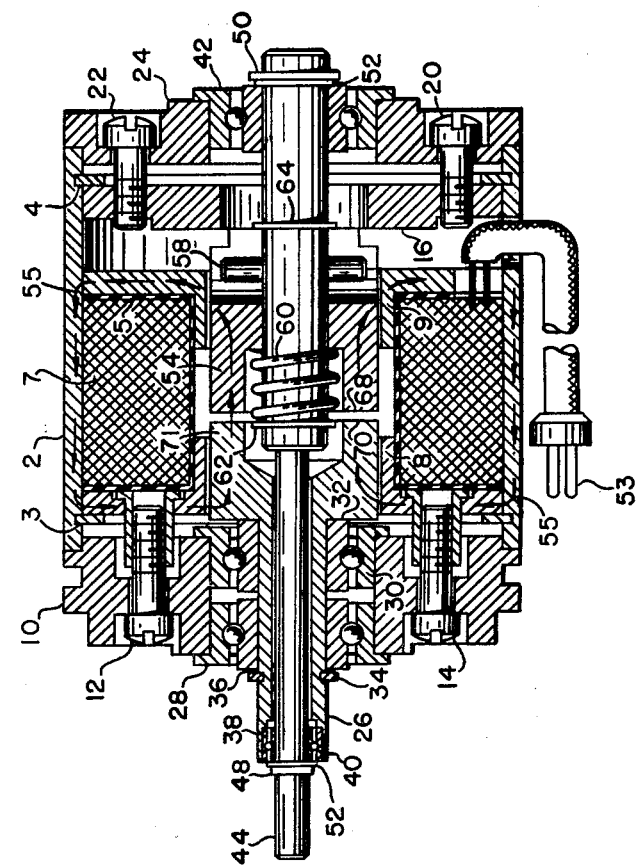
Figure 2 shows a cross-section view taken along plane 2—2 of Figure 1.
Figure 1:
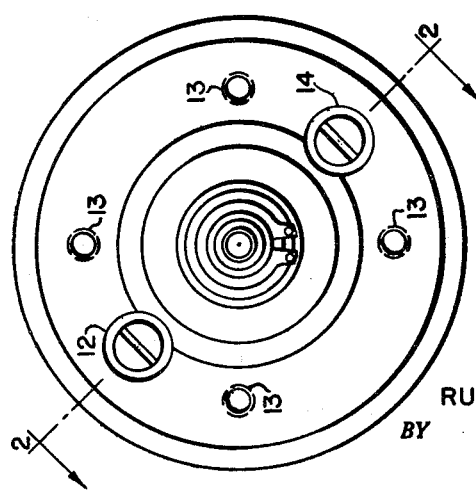
Figure 1 shows an end view of the clutch of this invention.

With particular reference to Figure 2, there is disclosed cylindrical sleeve 2 of a magnetic material provided with retaining rings 3 and 4 set in recesses of sleeve 2. Within sleeve 2 there is positioned an assembly comprising coil form 5, annular electro-magnet coil 7 and annular pole pieces 8 and 9. End member 10 is shaped to cooperate with standard military type components used, for example, to mount the MK14 Mod. O servomotor. End member 10, commonly called a "servo mount" is bolted to assembly 8 by means of screws 12 and 14. At the other end of sleeve 2 there is provided a metal plate 16 which is locked against retaining ring 4 by the action of screws 20 and 22 against end plate 24. Threaded holes 13 provide an alternate mounting means.

Hollow shaft 26 is supported by flanged ball bearing assemblies 28 and 30, the assemblies 28 and 30 being held captive in coupling 10 by the combined effect of stepped portion 32 of shaft 26 and lock ring 34. Shims 36 are used as required to prevent end play of the shaft 26. Shaft 26 is normally used as the input shaft of the apparatus.

At one end of shaft 26, a stepped recess 38 is provided for the mounting of a ball bearing assembly 40. End plate 24 is provided with flanged ball-bearing assembly 42. A shaft 44 is carried by ball-bearing assemblies 40 and 42. Lock rings 48 and 50, together with such shims 52 as may be required to compensate for normal manufacturing variations, serve to retain the bearing assemblies 40 and 42 and shaft 44. Cup-shaped armature 54 of magnetizable material is slidably mounted on shaft 44. As may be clearly appreciated by reference to Figure 3, actuator 54 is provided with a groove 56 adapted to receive pin 58 which extends through shaft 44. As armature 54 rotates pin 58 in turn causes shaft 44 to rotate. Spring member 60 acting against lock ring 62, which is secured in a groove in shaft 44, causes armature 54 to act against stop 64. Stop 64 is also a lock ring secured in a recess in shaft 44. Armature 54 is provided with a recessed portion 66 which prevents frictional interference between actuator 54 and plate 16.

Leads 53 connect a source of electrical energy (not shown) to coil 7. When the coil 7 is energized, armature 54 is caused to move by the resulting magnetic field, whose path is shown by arrows 55, until face 68 of the armature is in contact with face 70 of cup-shaped magnetizable portion 71 of shaft 26. Upon engagement of clutch faces 68 and 70, armature 54 rotates in keeping with the rotation of input shaft 26. When coil 7 is de-energized, compression spring member 60 causes clutch faces 68 and 70 to separate as explained earlier.

The output shaft may be braked upon de-energization by the use of a braking surface 76 positioned in confronting relationship to frictional engaging surface 74 of member 16. Disc 72 is shown affixed to the armature in Figures 5, 6 and 7. In Figure 6 braking surface 76 is shown as the face of disc 72. In Figure 5 the disc 72 is shown in the braked position wherein braking surface 76 is in engagement with frictional engaging surface 74. The disc 72 may be soldered, welded or simply staked in position on armature 54.

The brake torque obtained is a function of the pressure of spring member 60 and the material and surface finish of frictional engaging surface 74 and braking surface 76.

Suitable materials are well known and may be selected to meet particular requirements from many commercially available sources.

It is to be noted that from the viewpoint of manufacturing economy, two different embodiments are obtainable from one set of components. More specifically, by merely omitting annular disc member 72 a clutch is obtained with an output shaft which is free running when the unit is de-energized. If member 72 is incorporated and lock ring 64, which acts as a stop, is eliminated then the output shaft is braked when the unit is de-energized.

Although specific reference has been made to output and input shafts, it should be understood that dependent on the requirement of a given installation either shaft 26 or 44 may be the input shaft and the other the output shaft.

While I have described the principle of operation of my invention, together with the apparatus which represents the best mode presently contemplated for carrying out my invention, it will be understood that the apparatus disclosed is only illustrative and that the invention can be carried out by means of many other modifications and arrangements skilled to the art. The invention is therefore not intended to be limited to the present modifications shown but its scope is defined by the appended claims.

What I claim as new is:

1. A low torque precision electromagnetic clutch apparatus comprising a tubular casing; a first end member enclosing one end of said casing; a second end member enclosing the other end of said casing; a first shaft extending through said first end member; means to prevent axial movement of said first shaft; a first magnetizable member extending radially from said first shaft and rotatable therewith; a first clutch face carried by said first magnetizable member; a second shaft coaxial with said first shaft extending through said first end member; means to prevent axial displacement of said second shaft; a magnetizable armature member movable axially with respect to said second shaft and rotatable therewith; a second clutch face carried by said armature member, in confronting relationship to said first clutch face; resilient means biasing said armature apart from said first magnetizable member so as to prevent engagement of said clutch faces; and electromagnetic flux generating means for overcoming the biasing effect of said resilient means and axially moving said armature member so as to cause engagement of said clutch faces.

2. A low torque precision electromagnetic clutch-brake apparatus comprising a tubular casing; a first end member enclosing one end of said casing; a second end member enclosing the other end of said casing; a first shaft extending through said first end member; means to prevent axial movement of said first shaft; a first magnetizable member extending from said first shaft and rotatable therewith; a first clutch face carried by said first magnetizable member; a second shaft coaxial with said first shaft, and extending through said first end member; means to prevent axial movement of said second shaft; a magnetizable armature member movable axially with respect to said second shaft and rotatable therewith; a second clutch face carried by said armature member, in confronting relationship to said first clutch face; a braking surface carried by said armature means; a frictional engaging surface supported within said casing in confronting relationship to said braking surface; resilient means biasing said armature apart from said first magnetizable member so as to (1) prevent engagement of said clutch faces and (2) place said braking surface into engagement with said frictional engaging surface; and electromagnetic flux generating means for overcoming the biasing effect of said resilient means and axially moving said armature member so as to cause (1) engagement of said clutch faces and (2) disengagement of said braking surface and said frictional engaging surface.

3. A low torque precision electromagnetic clutch apparatus comprising a tubular casing; a first end member enclosing one end of said casing; a second end member enclosing the other end of said casing; a first shaft extending through said first end member; means to prevent axial movement of said first shaft; a first magnetizable member extending radially from said first shaft and rotatable therewith; a first clutch face carried by said first magnetizable member; a second shaft coaxial with said first shaft extending through said first end member; means to prevent axial displacement of said second shaft; a pin member extending radially from said second shaft; a magnetizable armature member provided with a slot parallel to said second shaft adapted to receive said pin member, said armature member being free to move axially with respect to said second shaft and constrained to rotate therewith by said pin member; a second clutch face carried by said armature member, in confronting relationship to said first clutch face; resilient means biasing said armature apart from said first magnetizable member so as to prevent engagement of said clutch faces; and electromagnetic flux generating means for overcoming the biasing effect of said resilient means and axially moving said armature member so as to cause engagement of said clutch faces.

4. A low torque precision electromagnetic clutch-brake apparatus comprising a tubular casing; a first end member enclosing one end of said casing; a second end member enclosing the other end of said casing; a first shaft extending through said first end member; means to prevent axial movement of said first shaft; a first magnetizable member extending from said first shaft and rotatable therewith; a first clutch face carried by said first magnetizable member extending from said first shaft and rotatable therewith; a first clutch face carried by said first magnetizable member; a second shaft coaxial with said first shaft, and extending through said first end member; means to prevent axial movement of said second shaft; a pin member extending radially from said second shaft; a magnetizable armature member provided with a slot parallel to said second shaft adapted to receive said pin member, said armature member being free to move axially with respect to said second shaft and constrained to rotate therewith by said pin member; a second clutch face carried by said armature member, in confronting relationship to said first clutch face; a braking surface carried by said armature means; a frictional engaging surface supported within said casing in confronting relationship to said braking surface; resilient means biasing said armature apart from said first magnetizable member so as to (1) prevent engagement of said clutch faces and (2) place said braking surface into engagement with said frictional engaging surface; and electromagnetic flux generating means for overcoming the biasing effect of said resilient means and axially moving said armature member so as to cause (1) engagement of said clutch faces and (2) disengagement of said braking surface and said frictional engaging surface.

References Cited in the file of this patent

UNITED STATES PATENTS

| | | |
|---|---|---|
| 1,359,321 | Brown | Nov. 16, 1920 |
| 1,697,595 | Henderson | Jan. 1, 1929 |
| 2,401,003 | Lear | May 28, 1946 |
| 2,464,129 | Goettisheim | Mar. 8, 1949 |
| 2,490,044 | Garbarini | Dec. 6, 1949 |
| 2,514,385 | Garbarini et al. | July 11, 1950 |
| 2,757,768 | Landerer | Aug. 7, 1956 |
| 2,796,962 | Pierce | June 25, 1957 |
| 2,801,720 | Bachman | Aug. 6, 1957 |

FOREIGN PATENTS

| | | |
|---|---|---|
| 119,972 | Germany | Apr. 30, 1901 |

Notice of Adverse Decision in Interference

In Interference No. 91,148 involving Patent No. 2,859,845, R. Bachman, ELECTROMAGNETIC CLUTCH, final judgment adverse to the patentee was rendered Mar. 29, 1963, as to claims 1, 2, 3 and 4.

[*Official Gazette December 14, 1965.*]